3,047,359
PURIFICATION OF CRUDE THORIUM SULFATE
Clifford W. Kline and Wallis R. Bennett, Midland, Mich., assignors to The Dow Chemical Company, Midland, Mich., a corporation of Delaware
Filed June 16, 1958, Ser. No. 742,000
9 Claims. (Cl. 23—14.5)

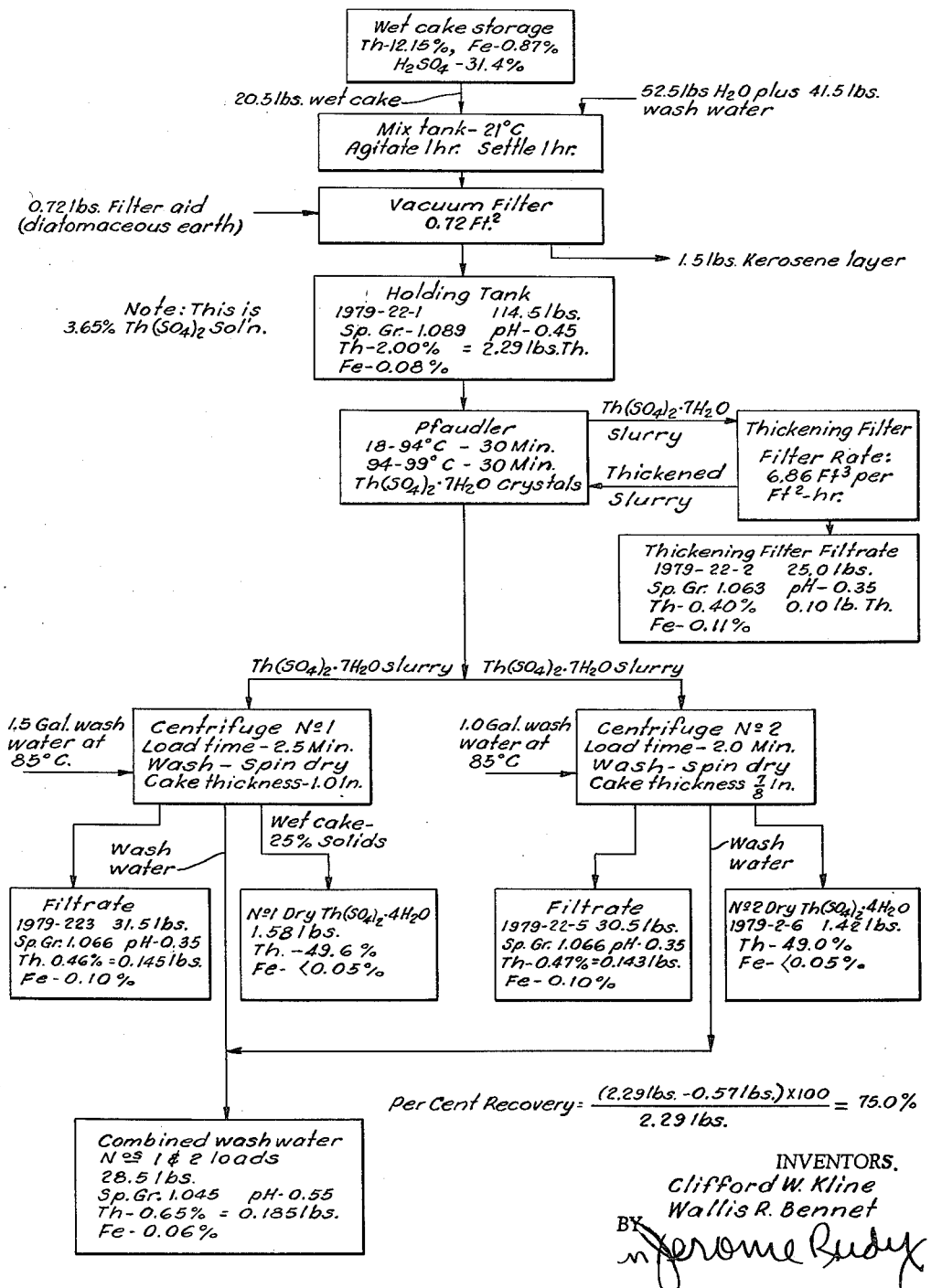

The present invention is germane to the inorganic chemical arts and is more particularly pertinent to the contribution and provision of a new and improved process for the preparation of purified thorium sulfate from crude, aqueous, saline compositions of the salt which oftentimes contain some free sulfuric acid and also contain other saline impurities, such as iron and other rare earth compounds. It also relates to the provision of a new and useful hydrated form of thorium sulfate, the heptahydrate, obtained as a product of the present process.

Thorium (symbol "Th," atomic number 90, atomic weight 232.12) is a dark gray metal that is among the most valuable of the rare elements. It is found in the minerals thorite, orangite, euxenite, aureite, and in monazite sand (of the rare earth). It may also be obtained as a byproduct in certain uranium processing operations. Among other techniques, thorium is readily extracted from its ores with sulfuric acid whereupon an aqueous, saline solution comprised of thorium sulfate and other dissolved impurities is obtained. Such extraction produces a crude product which frequently contains some sulfuric acid and, even after conventional treatment, results in a crude thorium sulfate salt which is usually contaminated with sulfates of iron, uranium, yttrium and the rare earth elements. It is ordinarily difficult to satisfactorily, and on an efficient and economical basis, purify such crude thorium sulfate salt products.

It would be a great advantage, and it is the chief aim and concern of the present invention, to provide an efficient and effective process for the purification of crude thorium sulfate which could be practiced and accomplished on a simple, straightforward and economical basis to facilitate the manufacture of substantially pure thorium sulfate in a satisfactory form and manner. It would also be an advantage, and it is also an object of the invention, to provide a new and useful hydrated form of thorium sulfate, the heptahydrate, $Th(SO_4)_2 \cdot 7H_2O$.

To the realization of the indicated objectives and corollary ends, crude thorium sulfate containing in association therewith such principal impurities as sulfate salts of iron, uranium, titanium, the rare earth elements (and possibly including such others as lead, bismuth and calcium, depending on the source of the thorium ore) may advantageously be purified and the heptahydrate (as well, possibly, as other hydrates) of thorium sulfate obtained by a process in accordance with the present invention which comprises (1) dissolving the crude thorium sulfate salt composition in water to make a crude thorium sulfate solution thereof; (2) heating the resulting crude thorium sulfate solution to a temperature of at least about 80° C.; (3) maintaining the thorium sulfate solution heated at the elevated temperature for a period of time sufficient to permit at least a portion of the thorium sulfate in solution to precipitate therefrom in a hydrate (generally the heptahydrate form, $Th(SO_4)_2 \cdot 7H_2O$); (4) isolating, by filtration or otherwise, the precipitated thorium sulfate hydrate from the hot mother liquor of crude thorium sulfate solution while maintaining said mother liquor at said elevated temperature; then, optionally (5), drying the separated and isolated thorium sulfate hydrate (which, as indicated, is frequently the heptahydrate) to convert the substantially pure thorium sulfate product either to anhydrous $Th(SO_4)_2$ or at least partially to the dried dihydrate form, $Th(SO_4)_2 \cdot 2H_2O$, or to the dry tetrahydrate, $Th(SO_4)_2 \cdot 4H_2O$, depending on drying conditions. Of course, if desired, the heptahydrate can be employed for many purposes in its as manufactured form without being dried to another form of the thorium sulfate.

Sulfuric acid may advantageously be added to the initially prepared solution of the crude thorium sulfate, or later in the process if desired, to further depress the solubility of the thorium sulfate in the hot solution so as to increase the recovery of the heptahydrate from the hot mother liquor of the crude salt. Frequently, the yield of desired product can be increased by as much as 10–15 or even 20 percent by purposive use of sulfuric acid in the crude solution of thorium sulfate being processed.

Practice of the process of the present invention generally permits a highly purified and essentially uncontaminated thorium sulfate product to be obtained. For example, finally dried thorium sulfate product, such as the di- or tetrahydrate, that is manufactured in the above described fashion ordinarily contains less than about 0.05 percent by weight of iron (Fe) and less than about 0.2 percent by weight of yttrium and rare earth elements, based on the weight of the recovered and purified thorium sulfate product. Such a purified product is generally well suited and excellently adapted to be utilized for practically any intended purpose, and is in a most advantageous form for further metallurgical operations. Of course, the heptahydrate form has equivalent purity.

The minimum concentration of thorium sulfate solution from which a pure thorium sulfate crystal can be produced in the practice of the present process is about 0.75 percent by weight, based on the weight of the solution. It is generally desirable for the initially prepared solution of crude thorium sulfate to contain greater concentrations of the salt up to its limit of solubility at the particular temperature at which the aqueous solvent is employed. While the water used for preparation of the crude initial solution may be at any temperature between its freezing point and about 80° C., it is generally more expedient to use temperatures between about 20 and 50° C. for the solvent. This is particularly so when more substantial concentrations of the thorium sulfate in the crude solution are being handled, such as those wherein at least about 3 weight percent of thorium sulfate is dissolved. Optimum operating temperature, as is apparent, also depends somewhat on the sulfuric acid concentration employed in the crude solution. As is apparent, normal room (or other ambient) temperatures are generally preferred for the dissolving water used in the preparation of the initially obtained crude solution. Likewise, it is usually advantageous for the concentration of thorium sulfate in the initially prepared solution to be between about 3 and about 5 percent by weight, based on the weight of the solution. The crude thorium sulfate that is dissolved may be any crude thorium sulfate, including the ordinarily obtained cake (or wet cake) of thorium sulfate, which may be comprised of a hydrate, obtained as the product of the sulfuric acid extraction process on a thorium ore. Or it may, with great advantage, be such a material as thorium acid sulfate, $ThSO_4 \cdot H_2SO_4$ (which usually contains some additional free acid) which is obtained as the product of certain recovery processes for obtaining thorium sulfate from thorium-bearing ores.

The solution of crude thorium sulfate, as indicated, is heated to a temperature of at least about 80° C. to permit crystallization of the purified heptahydrate salt therefrom. While the mother liquor may be maintained at any greater elevated temperature up to ebullient temperatures during the crystallization, a temperature in the range between about 80 and 95° C. is generally advantageous for such purpose.

Upon reaching the crystallization temperature, the thorium sulfate heptahydrate crystals (as well as crystals of any other hydrates obtained) commence immediate formation and the precipitation is usually complete to the equilibrium point within several minutes, ordinarily not in excess of about three-quarters of an hour. While it is usually preferred to permit the crystallization to proceed to equilibrium, especially in batch operations, it can obviously be stopped at any desired point after any desired portion of the thorium sulfate has been precipitated from the mother liquor. This can be done by simply cooling the mother liquor to a temperature beneath about 80° C., as by refrigeration (if desired) or, preferably and more economically, by addition of cold water. In this connection, the process of the present invention can be conducted with great facility and convenience on a batch-wise basis, using conventional equipment for the purpose. If desired, however, continuous crystallization techniques and apparatus for such purpose can also be employed merely by maintaining the temperature of the mother liquor in the precipitator above about 80° C. The present process is conducted with great benefit and economy under atmospheric pressure.

The crystallized and precipitated thorium sulfate hydrate, including the heptahydrate form, can be isolated from the crude mother liquor by any desired separating technique, including decantation, etc., although it is generally preferable to accomplish the separation by filtration, using any desired batch or continuously operating apparatus for the purpose. Likewise, the heptahydrate can be dried, if desired, in any manner with any suitable equipment in order to obtain a final, dry product. Usually, drying temperatures between about 90 and 125° C. are expedient to employ. As mentioned, various finally dried thorium sulfate products can be obtained. Thus, regardless of the quantity of the heptahydrate in the recovered crystals (including yields consisting entirely of $Th(SO_4)_2 \cdot 7H_2O$), a dried tetrahydrate is obtained with drying temperatures between about 90 and 110° C. At drying temperatures between about 110 and 150° C., the dihydrate is usually obtained. Anhydrous thorium sulfate can be made by drying at 400–500° C.

If desired, the precipitating process can be repeated in sequential batch-wise steps, especially if the spent mother liquor is cooled and recycled and reused to dissolve additional crude thorium sulfate intended for purification. As indicated, sulfuric acid can be added to the mother liquor, either as initially prepared or after its heating to the crystallization temperature, in order to augment the recovery of the thorium sulfate hepta- or other hydrate. Up to 20 weight percent or more of the acid may thus be incorporated in the crude solution, based on the weight of the solution. In many cases, incidentally, especially when the crude thorium sulfate is obtained from acid cakes, including those comprised of thorium acid sulfate, enough free sulfuric acid may be present to provide between about 5 and 10 or so weight percent of sulfuric acid in the crude solution, based on total solution weight. Of course, any lesser quantity of the acid also exerts a beneficial effect as regards enhanced product yield. As indicated, acidification of the mother liquor, especially to about a 20 percent acid content, increases the yield of thorium sulfate by as much as 10 to 20 or so percent over that obtained with a substantially neutral solution.

The invention is further illustrated in and by the following examples, not intended to be limiting thereof, wherein all parts and percentages are to be taken on a weight basis.

*Example A*

About 253 parts of crude thorium sulfate wet cake were dissolved in about 1264 parts of plain water at a room temperature of about 25° C. and mixed thoroughly with 6.0 parts of diatomaceous earth filter aid in an agitated mix tank. The wet cake, which had been obtained by sulfuric acid extraction of a thorium-bearing ore, contained about 25.3 percent solids of which about 9.91 percent was Th and 0.45 percent was Fe. The wet cake contained about 43.7 percent total "$SO_4$" and 35.85 percent free $H_2SO_4$. After mixing, the crude thorium sulfate solution was passed at the same temperature through a clarifying filter wherein about 6.6 parts (on a dry basis) of insoluble residue was removed. The insoluble residue contained about 0.13 percent Th; 0.043 percent Y; 0.022 percent U; 1.23 percent Fe; 0.48 percent Ca; and 0.006 percent Zn. The clarified filtrate contained about 19.9 parts of thorium in the form of dissolved thorium sulfate. This represented a $Th(SO_4)_2$ concentration of about 3 percent. The clarified filtrate also contained about 6.0 percent $H_2SO_4$.

The clarified filtrate was then passed to a precipitator wherein it was heated to 80–85° C. and maintained at that temperature for about 60 minutes, during which time equilibrium was attained and a quantity (about 40 parts) of thorium sulfate heptahydrate was crystallized from the mother liquor. The crystals were filtered from the hot mother liquor then washed with about 200 parts of hot water (80° C.) before being removed for drying in the form of purified wet cake. The filtrate of the spent mother liquor plus wash water was found to contain about 0.41 percent (3.67 parts) Th; 0.052 percent Fe; 0.014 percent U; and 0.005 percent Y. The purified wet cake was dried overnight in an oven at about 100–110° C. to yield about 34.5 parts of purified mixture of thorium sulfate dihydrate and tetrahydrate. The purified salt product contained about 47.0 percent (16.2 parts) of elemental Th; less than 0.05 percent of Fe; and less than 0.2 percent of rare earth elements, as verified by X-ray fluorescence and emission spectroscopy. The percent thorium recovery, based on the quantity of the element in the clarified filtrate, was 81.4 percent.

*Example B*

Following the procedure delineated in the flow sheet diagram of the accompanying drawing, another sample of crude thorium sulfate wet cake was purified by the process of the present invention. The crude salt product was obtained with a residuum of kerosene that had been used in its manufacturing process. The operating conditions, procedural details and results obtained are all included in the illustrated flow sheet.

*Example C*

Using a crude thorium sulfate cake similar to that employed in the first example, the purification process of the present invention was conducted by means of a continuous crystallization procedure. The equipment employed consisted of a one liter, three-neck, round bottom flask, used as the crystallizer which had an overflow tube through the side. The overflow tube was placed in such a manner that the flask could hold a maximum volume of only 500 ml. The crystallizer was equipped with an agitator, reflux condenser and thermometer. A second three-necked flask, 3 liters size, was used to collect and hold the overflow crystal slurry from the crystallizer. It also had an agitator and thermometer in it.

The continuous process was carried out as follows: (1) The crystallizer feed was made by dissolving the crude thorium sulfate cake to give a 4.15 percent $Th(SO_4)_2$ solution; (2) 250 cc. (270 grams) was put into the crystallizer and the temperautre raised to 95° C., causing the thorium sulfate hydrate to crystallize; (3) as soon as the temperature reached 95° C., a continuous feed solution was fed to the crystallizer at the rate of 500 cc./hr. (or 540 gm./hr.). As soon as the crystal slurry reached the overflow, it flowed into the collecting flask. The rate of feed can be varied depending on the inventory time desired or needed; (4) the temperature in the crystallizer was maintained at 95° C.; (5) about Since many changes and modifications in the practice of the present invention are possible without substantially departing from its intended spirit and scope, it is to be fully understood that the invention is to be interpreted and construed in the light of the hereto appended claims rather than strictly from the foregoing illustrative specification and description.

What is claimed is:

1. Process for purifying crude wet cake thorium sulfate containing, as major impurities, sulfates of iron, yttrium and rare earth elements, which process comprises, initially preparing a solution of the crude thorium sulfate from said wet cake by dissolving it in water at a temperature between about 20° C. and about 50° C. so as to obtain between about 0.75 and 5 weight percent of dissolved thorium sulfate in said solution; heating the crude thorium sulfate solution to a temperature between about 80° C. and the boil; maintaining the crude thorium sulfate solution at said elevated temperature until at least a portion of the thorium sulfate therein precipitates therefrom in the form of a crystallized thorium sulfate hydrate comprising thorium sulfate heptahydrate; then separating the precipitated and purified thorium sulfate hydrate from the crude aqueous solution.

2. The process of claim 1, wherein said crude thorium solution is initially made to contain between about 3 and 5 weight percent of dissolved thorium sulfate.

3. The process of claim 1, wherein said crude thorium sulfate is heated to a temperature between about 80 and 95° C. in order to crystallize said thorium sulfate hydrate therefrom.

4. The process of claim 1, wherein said crude thorium sulfate solution is maintained at said elevated crystallizing temperature until about equilibrium between the precipitated thorium sulfate hydrate and the remaining dissolved thorium sulfate is attained.

5. The process of claim 1, wherein said precipitated thorium sulfate hydrate is separated by filtration.

6. The process of claim 1, and including the additional step in combination therewith of acidifying the crude thorium sulfate solution with sulfuric acid in an amount between about 5 and 20 weight percent of $H_2SO_4$, based on the weight of the solution.

7. The process of claim 1, and including the additional step in combination therewith of subsequently drying said separated thorium sulfate hydrate until at least a portion of it is converted to the dihydrate form.

8. The process of claim 1, wherein said crude wet cake thorium sulfate is comprised of thorium acid sulfate, $ThSO_4 \cdot H_2SO_4$.

9. The process of claim 1, wherein substantially all of said precipitated and crystallized thorium sulfate hydrate in the heptahydrate, $Th(SO_4)_2 \cdot 7H_2O$.

References Cited in the file of this patent

UNITED STATES PATENTS 2,783,125     Rohden _____ Feb. 26, 1957

OTHER REFERENCES

Audsley et al.: Extraction and Refining of the Rarer Metals, March 23, 1956, pp. 351–358, Stephen Austin & Sons, Ltd., Caxton Hill, Hertford, England.

Gmelins Handbuch Der Anorganischen Chemie Thorium and Isotope System—Number 44 (1955), pp. 44–46 and 283–289.

Kithil: Technical Paper 110, Bur. of Mines, Dept. of Interior, Oct. 1, 1915, pp. 24 and 25.

Krumholz et al.: Proceedings of the International Conference on the Peaceful Uses of Atomic Energy, Aug. 8–20, 1955, vol. 8, pp. 126–128, United Nations, New York.

Mellor: Comprehensive Treatise on Inorganic and Theoretical Chemistry, vol. 7, pp. 240–243 (1927), Longmans, Green & Co., London.

Since many changes and modifications in the practice of the present invention are possible without substantially departing from its intended spirit and scope, it is to be fully understood that the invention is to be interpreted and construed in the light of the hereto appended claims rather than strictly from the foregoing illustrative specification and description.

What is claimed is:

1. Process for purifying crude wet cake thorium sulfate containing, as major impurities, sulfates of iron, yttrium and rare earth elements, which process comprises, initially preparing a solution of the crude thorium sulfate from said wet cake by dissolving it in water at a temperature between about 20° C. and about 50° C. so as to obtain between about 0.75 and 5 weight percent of dissolved thorium sulfate in said solution; heating the crude thorium sulfate solution to a temperature between about 80° C. and the boil; maintaining the crude thorium sulfate solution at said elevated temperature until at least a portion of the thorium sulfate therein precipitates therefrom in the form of a crystallized thorium sulfate hydrate comprising thorium sulfate heptahydrate; then separating the precipitated and purified thorium sulfate hydrate from the crude aqueous solution.

2. The process of claim 1, wherein said crude thorium solution is initially made to contain between about 3 and 5 weight percent of dissolved thorium sulfate.

3. The process of claim 1, wherein said crude thorium sulfate is heated to a temperature between about 80 and 95° C. in order to crystallize said thorium sulfate hydrate therefrom.

4. The process of claim 1, wherein said crude thorium sulfate solution is maintained at said elevated crystallizing temperature until about equilibrium between the precipitated thorium sulfate hydrate and the remaining dissolved thorium sulfate is attained.

5. The process of claim 1, wherein said precipitated thorium sulfate hydrate is separated by filtration.

6. The process of claim 1, and including the additional step in combination therewith of acidifying the crude thorium sulfate solution with sulfuric acid in an amount between about 5 and 20 weight percent of $H_2SO_4$, based on the weight of the solution.

7. The process of claim 1, and including the additional step in combination therewith of subsequently drying said separated thorium sulfate hydrate until at least a portion of it is converted to the dihydrate form.

8. The process of claim 1, wherein said crude wet cake thorium sulfate is comprised of thorium acid sulfate, $ThSO_4 \cdot H_2SO_4$.

9. The process of claim 1, wherein substantially all of said precipitated and crystallized thorium sulfate hydrate in the heptahydrate, $Th(SO_4)_2 \cdot 7H_2O$.

References Cited in the file of this patent

UNITED STATES PATENTS 2,783,125     Rohden _____ Feb. 26, 1957

OTHER REFERENCES

Audsley et al.: Extraction and Refining of the Rarer Metals, March 23, 1956, pp. 351–358, Stephen Austin & Sons, Ltd., Caxton Hill, Hertford, England.

Gmelins Handbuch Der Anorganischen Chemie Thorium and Isotope System—Number 44 (1955), pp. 44–46 and 283–289.

Kithil: Technical Paper 110, Bur. of Mines, Dept. of Interior, Oct. 1, 1915, pp. 24 and 25.

Krumholz et al.: Proceedings of the International Conference on the Peaceful Uses of Atomic Energy, Aug. 8–20, 1955, vol. 8, pp. 126–128, United Nations, New York.

Mellor: Comprehensive Treatise on Inorganic and Theoretical Chemistry, vol. 7, pp. 240–243 (1927), Longmans, Green & Co., London.